United States Patent [19]

Sachs et al.

[11] Patent Number: 4,801,631

[45] Date of Patent: Jan. 31, 1989

[54] AQUEOUS GLUE DISPERSIONS CONTAINING POLYISOCYANATES, THEIR PREPARATION AND USE

[75] Inventors: Hanns I. Sachs, Cologne; Donald R. Larimer, Bergisch Gladbach, both of Fed. Rep. of Germany

[73] Assignee: Bayer Aktiengesellschaft, Leverkusen, Fed. Rep. of Germany

[21] Appl. No.: 11,648

[22] Filed: Feb. 6, 1987

[30] Foreign Application Priority Data

Feb. 26, 1986 [DE] Fed. Rep. of Germany ....... 3606087

[51] Int. Cl.$^4$ .................... C08L 31/04; C08L 75/00
[52] U.S. Cl. ........................... 524/18; 524/13; 524/14; 524/15; 524/16; 524/17; 524/21; 524/25; 524/26; 524/27; 524/37; 524/47; 524/49; 524/72; 156/328; 156/336
[58] Field of Search ................ 524/13, 14, 15, 16, 524/17, 18, 21, 25, 26, 27, 37, 47, 49, 72; 156/328, 336

[56] References Cited

U.S. PATENT DOCUMENTS

| | | | |
|---|---|---|---|
| 4,209,433 | 6/1980 | Hse | 156/62.2 |
| 4,396,738 | 8/1983 | Powell et al. | 524/228 |
| 4,433,095 | 2/1984 | Hombach et al. | 524/199 |

FOREIGN PATENT DOCUMENTS

| | | |
|---|---|---|
| 2336381 | 2/1975 | Fed. Rep. of Germany . |
| 2403656 | 10/1975 | Fed. Rep. of Germany . |
| 1205893 | 2/1967 | United Kingdom . |

OTHER PUBLICATIONS

W. Hackbarth and W. V. Bockelmann, "Dispersions-Isocyanatsysteme: Neue Klebstoff-Generation fur die Holzindustrie", Adhasion 11, 1982.

O. Wittman and H. Lehnert, "Diisocyanate als Bindemittel", Holz-Zentralbatt, No. 59, May 17, 1974.

*Primary Examiner*—John Kight
*Assistant Examiner*—Nathan M. Nutter
*Attorney, Agent, or Firm*—Gene Harsh; Joseph C. Gil; Aron Preis

[57] ABSTRACT

This invention relates to formaldehyde-free, aqueous glue dispersions which contain polyisocyanates. These systems are particularly suitable for gluing veneers and surface materials on wood and wood products. The systems are prepared from polyisocyanates in combination with extenders based on flours and cold water-soluble of hydrolyzed natural starch. In this process, polyisocyanates or aqueous dispersions thereof are added while stirring to aqueous solutions or mixtures of starch and flour.

The extender-containing adhesive systems are aqueous glue dispersions having increased service life which in their preferred embodiment contain about 15 to 30% by weight of polyisocyanates, preferably polyphenyl-polymethylene polyisocyanate (PMDI), 10 to 15% by weight of starch which is soluble in cold water and 14 to 25% by weight of (cereal) flour and optionally, other additives and the appropriate quantity of water adding up to 100% by weight. The glue dispersions are easily applied with glue spreading machines and if applied in suitable quantities do not bleed through veneers. The implements used for applying the glues can easily be cleaned by rinsing them with water.

The invention is also directed to the use of the glue dispersions for gluing, particularly for gluing veneers or other surface coating materials to wood or wood products.

9 Claims, No Drawings

AQUEOUS GLUE DISPERSIONS CONTAINING POLYISOCYANATES, THEIR PREPARATION AND USE

FIELD OF THE INVENTION

The invention is related to glue dispersions and more particularly, to polyisocyanate-containing glues.

SUMMARY OF THE INVENTION

This invention relates to formaldehyde-free, aqueous glue dispersions which contain polyisocyanates. These systems are particularly suitable for gluing veneers and surface materials on wood and wood products. The systems are prepared from polyisocyanates in combination with extenders based on flours and water-soluble or hydralysed starch. In this process, polyisocyanates or aqueous dispersions thereof are added while stirring to aqueous solutions or mixtures of starch and flour.

The thus obtained adhesive systems are aqueous glue dispersions having increased service life which in their preferred embodiment contain about 15 to 30% by weight of polyisocyanates, preferably multinuclear polyphenyl-polymethylene polyisocyanate (PMDI) mixtures, 10 to 15% by weight of starch which is soluble in cold water and 14 to 25% by weight of (cereal) flour and optionally, other additives and the appropriate quantity of water adding up to 100% by weight. The inventive glue dispersions are easily applied with glue spreading machines and if applied in suitable quantities do not bleed through veneers. The implements used for applying the glues can easily be cleaned by rinsing them with water.

BACKGROUND OF THE INVENTION

Glues based on urea formaldehyde condensates are nowadays used on a wide scale for veneering and laminating wood and wood products. These glues are normally applied by the following method:

A mixture is prepared from urea formaldehyde resin, hardener, water and optionally organic extenders (e.g. flour or starch) and/or fillers (e.g. chalk or ground up coconut shell). The glue is applied to a wood panel by means of a roller spreading machine. The veneer or laminating material is placed on the supporting plate and hot pressed. One particular disadvantage of gluing systems based on aminoplastic resins is that the formaldehyde splits off during or after pressing. It is therefore difficult to comply with the stringent regulations for the maximum permissible concentration of formaldehyde in the surrounding atmosphere when such glued products are used in enclosed spaces.

Other gluing systems which contain no formaldehyde have therefore also been used. The so-called white glues based on polyvinyl acetate (PVAc) are well known. These glues may be applied either hot or cold but their use is limited by certain disadvantages due to the thermoplastic properties of polyvinyl acetate. Thus they are less water-resistant and heat-resistant then condensation resin products. Furthermore, problems arise when sanding down the surfaces and discoloration occur (in special types of wood such as oak when iron impurities are present) as well as problems due to the formation of steam blisters.

It is known from the publication by W. Hackbarth and W. V. Bockelmann, "Dispersions-Isocyanatsysteme: Neue Klebstoffgeneration für die Holzindustrie", Adhäsion 1982, 11, pages 4–6, that improved PVAC glues are obtained by the addition of polyisocyanates. The advantageous processing characteristics of aqueous PVAc dispersions are combined with the advantages of reactive isocyanate adhesives. More stable glues can therefore be obtained but the problems of sanding down and risk of discoloration remain.

A process for the preparation of aqueous polyurethane glue systems based on low molecular weight or relatively high molecular weight polyols plus di-/polyisocyanates is described in DE-A No. 2,403,656. In this process, lignin sulphonate and/or dextrin and/or methylcellulose are stirred in as well as surface-active substances. For economical reasons, however, polyurethane glue systems have become established only in special fields of application.

According to the publication by O. Wittman and H. Lehnert, "Diisocyanate als Bindemittel (Zur Herstellung von Holzwerkstoffen mit Diisocyanat)", Holz-Zentralblatt, May, 1974, pages 913–9, water resistant glues for plywood can be prepared from pure non-aqueous polyisocyanate adhesives. However, the strong tendency of both low viscosity and high viscosity non-aqueous polyisocyanate adhesive systems to bleed out is mentioned as one of the disadvantages. Although this tendency was prevented by the addition of organic extenders, the mixtures could only be used within a very short time and the polyisocyanate reacted rapidly with the extenders. Even the additional use of fillers could not completely prevent the bleeding out of the glues. It was also pointed out that these non-aqueous polyisocyanate adhesive systems could not be applied with conventional glue spreading machines because they soiled the rollers. The organic solvents were also said to cause problems in some cases (difficulty of removal), environmental problems, costs and toxicity).

It is an object of the present invention to develop polyisocyanate containing adhesive systems which have a suitable viscosity as well as a sufficiently long pot life and can be applied by conventional mechanical glue spreading processes. According to the invention, these objects are achieved by emulsifying the polyisocyanate in an aqueous mixture of starch and flour. Bleeding of the polyisocyanate through the veneer can thus be prevented with inexpensive and simple glues.

DETAILED DESCRIPTION OF THE INVENTION

The glue dispersions of the invention may be prepared, for example, by stirring polyisocyanates into a previously prepared aqueous mixture of flour (bean flour and/or cereal flour) and starch (cold water starch or hydrolyzed natural starch). Certain variations in the method of preparation are also possible, as will be mentioned hereinafter. In the viscous aqueous mixture of (cold water) soluble starch and cereal flour the polyisocyanate can be easily emulsified, for example by simple stirring. The use of powerfully dispersing high speed mixing apparatus, for example, Ultra-Turrax, is not necessary. Furthermore, the aqueous glue dispersion remains stable. It was surprisingly found that the pot life of the glue dispersion is considerably increased by the combination of the organic extenders. This is demonstrated by monitoring the viscosity and the residual isocyanate content in the glue dispersion of the invention.

According to a preferred embodiment of the invention, the aqueous glue dispersion has the following composition, the percentages being based on the aqueous glue dispersion: about 7 to 50% by weight, preferably 10 to 40% by weight, most preferably 15 to 30% by weight of polyisocyanate, 5 to 20% by weight, preferably 10 to 15% by weight of (cold water) soluble starch, 10 to 35% by weight, preferably 14 to 25% by weight of flours, the remainder consisting of water and optionally the usual additives such as catalysts or stabilizers. The optimum amount of polyisocyanates, in particular polyphenyl-polymethylene polyisocyanates in the aqueous dispersion is found to be about 18 to 22% by weight, particularly if the composition contains 10 to 15% by weight, preferably 1 to 14% by weight of cold water starch and 14 to 25% by weight of cereal based flour, preferably rye flour.

The polyisocyanates have an average functionality of more than 2.0, preferably at least 2.3, in particular at least 2.5 and a functionality of up to 4, preferably up to 3. Their viscosity should preferably be from 50–5000 mPas/25° C., in particular from 50–1250 mPas/25° C. Polyisocyanates having aromatically bound NCO groups are preferred.

Suitable polyisocyanates include polyphenyl-polymethylene polyisocyanates (PMDI), triphenylmethane triisocyanates, (thio)phosphoric ester triisocyanate or other typical adhesive isocyanates containing three isocyanate groups. Other useful isocyanates may be those prepared by biuretization, dimerization, trimerization, carbodiimidization or the reaction of di-/polyisocyanates with polyfunctional (e.g. 3 to 5-functional), preferably low molecular weight compounds (e.g. with molecular weights up to 399) such as polyols, polyamino alcohols or polyamines.

Isocyanate prepolymers based on diisocyanates and relatively high molecular weight polyols, e.g. with molecular weights from 400 to 10,000, are less preferred.

The polyisocyanates may be used singly or as mixtures. Numerous suitable polyisocyanates are listed in De-OS No. 3,108,538, at page 5 et seq., incorporated herein by reference.

Particularly suitable polyisocyanates are multinuclear polyphenyl-polymethylene polyisocyanates corresponding to the general formula

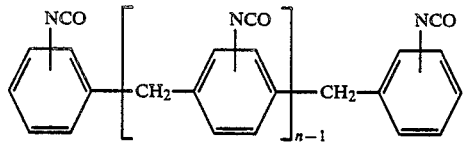

in which n denotes an integer from 1 to 5 or mixtures thereof which have an average functionality of up to 4 and a viscosity of 50 to 5000, preferably 50 to 1250 and especially 100 to 600 mPas/25° C. and an isocyanate content of 26 to 33% by weight, preferably 28 to 32.5% by weight, and an average functionality of at least 2.3 (n is an average at least 1.3), preferably at least 2.5 (n is on average at least 1.5). The content of low molecular weight monoisocyanate (e.g. phenylisocyanate obtained from residues of uncondensed aniline) should be as low as possible (at most 20 ppm, preferably at most 10 ppm).

The advantage of these polyphenyl-polymethylene polyisocyanates is that they are obtainable inexpensively on a large technical scale and can be easily and widely modified in their isocyanate content and their functionality/multi-nuclear content. They may be prepared, for example, by the acid catalyzed condensation of aniline and formaldehyde followed by phosgenation of the resulting mixture of polyarylamines as described, for example, in U.S. Pat. No. 3,471,543 (DE-OS No. 1,593,638). A similar technical teaching is given in German Offenlegungsschriften Nos. 1,913,473, 1,937,685 and 2,032,336. Common to all the described processes is that the condensation yields a polyarylamine mixture containing about 45 to 65% by weight of diphenylmethane diamines and a relatively large quantity of trinuclear and higher nuclear products. When these polyarylamine mixtures are subsequently reacted with phosgene, they yield polyisocyanates corresponding to the above formula in which the ratio of di- and higher functional compounds is virtually identical to that of the amine. The so-called crude diphenylmethane diisocyanate obtained (which is in fact a mixture of di- and polyisocyanates) may be used as such if it conforms to the given conditions. Alternatively, small quantities of pure diphenylmethane diisocyanate (4,4'- and possibly 2,4'- and/or 2,2'-isomers) may be distilled from the crude diphenylmethane diisocyanate (see e.g. U.S. Pat. No. 3,471,543) and the remainder, containing the higher functional polyisocyanates of the above formula at a higher concentration, may be used for the process. If virtually all the diphenylmethane diisocyanate is removed from such a crude diphenylmethane diisocyanate, as described, for example, in U.S. Pat. No. 3,163,666 (DE-PS No. 1,090,196), then a very highly viscous (about 10,000 mPas) distillation residue is obtained which can only be made fluid by heating to temperature above ca. 100° C. and is therefore difficult to handle and normally not usable (see also DE-OS No. 2,105,193).

Pure diphenylmethane diisocyanate may also be obtained in accordance with the teaching of U.S. Pat. No. 3,274,245 (DE-PS No. 1,205,975) according to which pure methylene dianiline is separated from the technical aniline formaldehyde condensate by fractional distillation and the diamine is then phosgenated. In this case, the distillation residue of higher nuclear polyarylamines may also be phosgenated.

Processes have been developed (see e.g. DE-OS No. 2,356,828) for preparing crude diphenylmethane diisocyanate containing more than 80% by weight, preferably more than 90% by weight, of pure 4,4'-diisocyanatodiphenylmethane. The undistilled bottom fractions which are obtained by the distillative working up of crude diphenylmethane diisocyanates of this type and which contain a proportion of multi-nuclear polyisocyanates and do not have too high a viscosity, are also suitable for use. A polyphenyl-polymethylene polyisocyanate mixture containing a higher proportion of 4,4'-diisocyanatodiphenylmethane to 2,4'-diisocyanatodiphenylmethane may also be obtained directly by suitably controlling the aniline/formaldehyde condensation. U.S. Pat. No. 3,277,173, for example, describes such a process for the preparation of polyamine mixtures of the diphenylmethane series containing a high proportion of 2,4'-diaminodiphenylmethane. Polyisocyanates enriched by the appropriate isomers can then be obtained by phosgenating these 2,4'-diaminodiphenylmethane enriched condensates. Methods of obtaining polyisocyanate mixtures enriched in 2,4'-diisocyanatodiphenylmethane are also indicated in German Offenlegungsschrift No. 1,937,685 and U.S. Pat. Nos. 3,260,751 and 3,362,979. 2,4'-diisocyanatodiphenylmethane with the required degree of purity can then be removed from these mixtures by fractional distillation under vacuum. The bottom fraction obtained from such fractional distillation is suitable for bonding materials containing lignocellulose, provided the undistilled bottom fractions do not have the higher compositions. Examples of suitable polyisocyanates include polyphenyl-polymethylene polyisocyanates obtained from a polyphenyl-polymethylene polyisocyanate containing 35 to 70% by weight of diisocyanatodiphenylmethanes including 1 to 8% by weight of 2,4'-diisocyanatodiphenylmethane and having a viscosity at 25° C. of 50 to 600 mPas and an isocyanate content of from 28 to 32% by weight. They may be obtained by phosgenation of the undistilled bottom fraction produced from an aniline/formaldehyde condensate by the removal of 25 to 90% by weight of 2,2'-, 2,2'- and/or 4,4'-diaminodiphenylmethane. Alternatively they may consist of the undistillable bottom fraction obtained from the crude phosgenation product of an aniline/formaldehyde condensate after removal of 25 to 90% by weight of 2,2'-, 2,4'- and/or 4,4'-diisocyanatodiphenylmethane.

The bottom fractions may be obtained by the removal of 45 to 90% by weight, preferably 55 to 85% by weight of diisocyanatodiphenylmethane from a crude diphenylmethane diisocyanate containing more than 85% by weight, preferably more than 90% by weight of diisocyanatodiphenylmethane. A crude diphenylmethane diisocyanate of this type may be obtained, for example, by the process according to DE-OS No. 2,356,828.

Another method consisting of distilling off 25 to 80% by weight, preferably 30 to 60% by weight of 2,4'-diisocyanatodiphenylmethane and optionally 4,4'- and 2,2'-diisocyantodiphenylmethane from a crude phosgenation product containing 60 to 90% by weight, preferably 65 to 75% by weight of diisocyantodiphenylmethane isomers including 20 to 60% by weight, preferably 30 to 40% by weight of 2,4'- and/or 4,4'- and/or 2,2'-isomers. Whichever method is employed distillation may be controlled to yield a residue which has the required composition according to the invention. The preparation of suitable polyisocyanates is described, for example, in DE-AS No. 2,711,958 as the preparation of polyisocyanates A to D and F and G (pages 12–13).

It is, of course, also possible (and in many cases easier in practice) to obtain the desired composition of isomers and oligomers of the polyisocyanate mixture by blending various components, e.g. various bottom fractions.

According to the invention, polyisocyanates may also be used with polyhydroxyl compounds preferably with higher molecular weight, of the kind known in polyurethane chemistry may also be used. In this case the two components are used in proportions corresponding to an NCO/OH ratio in the range of 1.5:1 to 10:1, preferably 2:1 to 5:1, and the two components may be put into the process either separately or as a reactive mixture. The chemical reaction between the polyisocyanates, the lignocellulose-containing material which is to be bonded, the extenders and any polyhydroxyl compounds present may be adjusted by means of additives such as stabilizers, catalysts and activators used in the usual quantities, e.g. 0.05 to 5% by weight, based on the solids content of the glue dispersion.

Suitable polyhydroxyl compounds have a molecular weight in the region of 400 to 10,000, preferably 1000 to 6000. These include, for example, polyesters, polyethers, polythioethers, polyacetals, polycarbonates and polyester amides and mixtures thereof containing at least 2, generally 2 to 8, preferably 2 to 4 hydroxyl groups, such as the compounds known per se for the production of polyurethanes. These as well as suitable additives are listed, for example, in DE-AS No. 2,711,958, columns 6 to 9, and examples may be taken from this publication.

The polyisocyanates useful in the process may be modified before or after their emulsion, for example by the addition of emulsifying compounds such as polyvinyl alcohols, (DE-PS No. 853,438, U.S. Pat. No. 3,178,310 and DE-OS No. 2,724,364), monoalkylethers of polyoxyethylene glycols (DE-PS No. 853,438, DE-OS No. 2,447,135 and U.S. Pat. No. 3,178,310), polyoxyethylene glycols (DE-PS No. 2,703,271 and EP-A No. 166,264) or they may be modified according to GB-P No. 2,093,780, DE-PS No. 3,109,317, U.S. Pat. No. 4,258,169, U.S. Pat. No. 4,257,995, DE-PS No. 2,932,175, DE-OS No. 3,111,562 or DE-OS No. 3,108,538 (i.e. with phosphoric acid ester compounds) or they may be modified with sulphonic acids according to EP-P No. 19,486. Surface active substances may also be used according to DE-PS No. 1,081,225 (ethoxylation products of monohydric alcohols, monoamine, monomercaptans or alkylmonophenols) or cyclic hydrophilic emulsifiers according to DE-OS No. 3,062,328/DE-OS No. 3,060,545.

Although relatively large quantities of emulsifying additives generally have the effect of somewhat reducing the strength of the bond, modified polyisocyanates containing relatively small quantitites of emulsifying agents are advantageous to use. Although quantities can only be given in relative terms, the preferred quantities of emulsifying additives are generally at most 3% by weight, preferably at most 1.5% by weight, based on the weight of the polyisocyanate.

The aqueous glue dispersions according to the invention may be used in combination with the aqueous solutions of glues or condensation products of formaldehyde and urea and/or melamine and/or phenol predominantly used in the timber industry as well as together with other binders and impregnating agents such as sulphite waste liquors or tannin. The binders according to the invention may be mixed with these additional binders in proportions ranging from 1:20 to 20:1, preferably from 1:10 to 10:1.

The starches used are either cold water soluble starches or hydrolyzed natural starches. Natural starches can be rendered water-soluble by heating their aqueous suspensions, e.g. to temperatures of at least 70° C. Viscosity-stable cold water-soluble starches (e.g. Amijel VA 159 ®, Maizena Hamburg-BRD) are particularly suitable.

The various types of flour which may be used as extenders include both bean flour and cereal flour, in particular wheat flour while rye flour is particularly preferred. Mixtures of cereal flours are also suitable. Mixtures of starch solution and flour are preferably prepared at about room temperature, e.g. at 10° to 35° C. The aqueous mixtures constitutes a homogeneous, pasty, white to ligh brown (depending on the type of flour), aqueous glue suspension which has generally a high concentration.

Other auxiliary substances may be used in quantities within the usual limits, e.g. dyes, brightening agents, pigments, stabilizers, emulsifiers, preservatives, disinfectants, catalysts or inert or reactive fillers.

The process according to the invention for preparing the glue dispersions may be carried out, as follows:

(a) the cold water starch is stirred into the water (at an approximately constant rate) and the mixture is then stirred at the rate of about 500 to 1000 revs/min for about 10 minutes at 20° to 25° C. to dissolve the starch completely, and (b) the flour is then added to this mixture at a substantially constant rate until a homogeneous suspension is obtained, and (c) the polyisocyanate which is liquid or emulsified in a proportion of the water is added with stirring at a low temperature (at most 45° C., preferably room temperature) to form a homogeneous mixture.

According to another embodiment, the glue dispersion is prepared as follows:

(a) the proportion of natural starch is stirred into the water and the mixture is heated to about 90° C. with stirring, e.g. at a rate of 500 to 1000 revs/min and is left at this temperature until the starch has hydrolyzed sufficiently to be soluble. The mixture is then cooled to room temperature, and (b) the flour is stirred into this mixture at a constant rate until a homogeneous mixture is obtained and (c) the polyisocyanate or an aqueous polyisocyanate emulsion is then added and mixed until homogeneous.

Alternatively, an aqueous emulsion of the polyisocyanate may be added to the starch solution before the flour is stirred in.

The procedure may be carried out continuously. For example, a measured quantity of flour may be continuously added to a starch solution and homogenized therein by means of static or dynamic mixing apparatus and this starch/flour solution may then be continuously mixed with a stream of the polyisocyanate or of its (optionally continuously prepared) polyisocyanate emulsion and discharged. The polyisocyanate component may be injected under pressure, for example, for improving mixing. The process of mixing may also be carried out according to DE-OS No. 3,420,997.

The consistency of the starch/flour mixture is preferably adjusted to a viscosity of 500 to 10000 mPas/25° C., preferably 1000 to 4000 mPas/25° C. The viscosity generally does not change significantly after introduction of the polyisocyanates. The glue dispersions according to the invention therefore generally have viscosities in the range of 500 to 10000 mPas/25° C., preferably 1000 to 4000 mPas/25° C. measured using a rotation-viscosimeter of Haacke, cyclinate TI.

The quantities of polyisocyanate and extenders and the usual additives (if used) are chosen in particular so that the aqueous glue dispersions are obtained with a total solids content of from 22 to 65% by weight, preferably from 29 to 65% by weight, in particular from 45 to 62% by weight.

The present invention thus relates to processes for the preparation of aqueous glue dispersions containing polyisocyanates and having a solid content of from 22 to 65% by weight, characterized in that 7 to 50% by weight of polyisocyanates having an average functionality of greater than 2.0, 5 to 20% by weight of soluble starch and 10 to 35% by weight of flour and optionally with the addition of conventional additives are stirred together in water.

In particular, aqueous starch solutions are mixed with the flour, and the polyisocyanate is emulsified in this suspension at temperatures of up to 45° C. or the polyisocyanate is emulsified in aqueous starch solutions and the flour is subsequently added.

The present invention also relates to aqueous polyisocyanate-containing stable glue dispersions having a viscosity in the range of 500 to 10000 mPas/25° C., comprising 7 to 50% by weight of polyisocyanates having an average functionality of greater than 2.0 and an extender mixture of 5 to 20% by weight of soluble starch and 10 to 35% by weight of flour, and optionally minor quantities of the usual additives in the form of a 22 to 65% by weight aqueous dispersion.

In particular the inventive glue disperions have a solid content of from 29 to 65% by weight and a viscosity in the range of from 1000 to 4000 mPas/25° C. and comprise 15–30% by weight of aromatic polyisocyanates having an average functionality greater than 2.0, 10–15% by weight of soluble starch and 14–25% by weight of flour.

The polyisocyanates used in the inventive glue dispersions are in particular polyphenyl-polymethylene polyisocyanates having a viscosity of 50 to 5000 mPas/25° C., preferably 50 to 1250 mPas, an isocyanate content of 26 to 33% by weight and an average functionality greater than 2, preferably at least 2.3.

The glue dispersions are easily applied with glue spreaders. They can be applied under conditions of constant overflow with recycling without risk of sticking or encrustation. One feature which is of particular technical importance, however, is that the machines can also be easily cleaned with water.

If the glue dispersions are left to stand without being stirred, they remain substantially unchanged in a suitable condition for use for up to about 3 hours before they become pasty. The reduction in isocyanate content in the aqueous glue dispersions is surprisingly slight. Stabilizing structures evidently form on the surfaces of the droplets of the emulsified polyisocyanate. The structures considerably retard any further reaction with water but the bonding effect remains unimpaired.

Extenders (starches and flour) are necessary not only for adjusting the viscosity of the glue dispersion and rendering it stable but also actively contribute to the bonding action (in addition to that of the polyisocyanates). The glue dispersions according to the invention containing aqueous polyisocyanates and extenders are also very homogeneous, have a sufficiently long pot life and are easily worked up and applied. They are also effective in filling joints and cracks and therefore capable of evening out irregularities, for example between veneer and chipboard panels. The open time after application of the adhesives is long enough to enable the positions of the veneers to be adjusted. The addition of cold water starch renders the dispersions creamy and gives it cold tack. Both these factors are advantageous when applying the glue dispersions.

Fillers such as powdered coconut shell, wood powder, powdered walnut shell, kaolin, powdered rock or chalk are different from the extenders used according to the invention and serve merely to dilute or reduce the cost of the inventive adhesive systems and generally make no positive contribution to the bond.

Aqueous emulsions of the polyisocyanates which contain no extenders, on the other hand, generally cannot be used in glue spreading machines, they harden on the surfaces of the machine and are difficult to wash off with water. In most cases they bleed through veneers and are not suitable for filling joints and cracks.

Glue dispersions not according to the invention but prepared merely for the purpose of comparison either from polyisocyanates, water and starch alone or from polyisocyanates, water and flour alone are unsuitable for practical purposes owing to the rapid rise in viscosity (short pot life of the glue dispersions). Furthermore, the granular texture of glue containing only flour as extender prevents their smooth and even application. Products obtained in comparison experiments using carboxymethyl celluloses (instead of starch) and flour were not suitable and the glue dispersions obtained had a foamy structure from the start and a gel-like texture when applied.

The aqueous polyisocyanate-containing glue dispersion according to the invention may also be combined with aqueous solutions of condensation products of formaldehyde and urea and/or melamine and/or phenol (phenol/formaldehyde, urea/formaldehyde, or melamin/formaldehyde adhesives) which have hitherto predominantly been used in the timber industry. The adhesives according to the invention may also be used in combination with adhesive raw materials such as tannins, bark extracts, sulphite waste liquor and lignin sulphonates as well as natural adhesives based on albumins such as gluten, casein or blood albumin and with synthetic adhesives such as polyvinyl acetate and synthetic resin latices. The proportions in which the polyisocyanate contained in the glue dispersion according to the invention are mixed with these adhesives or adhesive raw materials may preferably be in the range of 1:5 to 5:1.

The glue dispersions may be applied to the surfaces to be bonded by means of a toothed spatula, for example, or a conventional glue spreading machine. The amounts applied vary with the substrates but are normally about 30 to 300 gm/m², preferably 50 to 200 gm/m² and especially 70 to 150 gm/m².

The temperature at which pressure is applied is generally from 0° to 200° C., preferably 100° to 150° C. and more particularly 110° to 140° C. The specific pressures applied for bonding lie in the range of 0.2 to 10N/mm², preferably from 0.5 to 3.5N/mm². The pressure times are generally 30 to 600 seconds, preferably 60 to 130 seconds, in particular 90 to 180 seconds.

The invention thus also relates to a process for gluing, in particular for gluing veneers and other laminating materials to wood and timber products, wherein the inventive glue dispersions are applied, in particular in amounts of 30 to 300 gm/m² by applying a specific pressure of 0.2 to 10N/mm² at bonding temperatures of 70° to 200° C. and pressure times of 30 to 600 seconds; the glue dispersions being most preferably applied by means of conventional glue spreaders.

The invention is further illustrated, but is not intended to be limited by the following examples in which all parts and percentages are by weight unless otherwise specified.

The following starting substances were used in the examples given hereinafter:
1. Organic extenders
 (a) Extender flour
   bean flour mixture (Bonit ®, Werzel, Herford)
   wheat type flour (1600 and 1050, Kampffmeyer, Cologne/BRD)
   rye type flour (1370, Kampffmeyer, Cologne/BRD)
   AHAMA 405 mixture of rye and wheat flour (Hübermühle, Mannheim/BRD)
 (b) Starches
   cold water soluble (Amijel VA 159 ® and Snowflake 12610, Maizena (Kleve/BRD)
   natural (Special starch W. Maizena, Kleve/BRD)
 (c) Carboxymethyl cellulose (comparison)
   methylan ® (Henkel, Düsseldorf/BRD)
2. Inorganic extenders (comparison)
 rheological additives (Bentone LT ®, Kronos-Titan, Leverkusen/BRD)
3. Emulsifying agent (comparison)
 animal glue jelly (Optal 1528 ®, Sichel, Hannover/BRD)
4. Urea formaldehyde resin
 (Kaurit 385 liquid, BASF, Ludwigshafen/BRD).
5. Polyisocyanates

| Product name | Chemical name | Isocyanate content % | Viscosity mPas (25° C.) |
| --- | --- | --- | --- |
| Desmodur VP PU 1520 A31 | Solvent free diphenylmethane-4,4'-diisocyanate containing higher functional isocyanates (average functionality >2) | 30.5 ± 1.5 | 300 ± 50 |
| Desmodur VP PU 1194 | Solvent-free diphenylmethane-4,4'-diisocyanate containing higher functional isocyanates (average functionality >2.3) | 30 ± 1 | 2100 ± 400 |
| Desmodur 44 V20 | Solvent-free modified diphenylmethane-4,4-diisocyanate containing higher functional isocyanates (average functionality >2) | 30–32 | 200 ± 40 |
| Desmodur | Solvent-free diphenylmethane-4,4'-diisocyanate containing higher functional isocyanates (average functionality >2) | 31 | 120 ± 25 |

Preparation of the glue dispersions

The glue dispersions (for compositions see the following Tables) were prepared as follows:
1. With flour only (comparison) Place water in container, add flour slowly while stirring, add PMDI, (=polyphenyl-polymethylene polyisocyanates) stir at about 1500 revs/min for 30 seconds (Pendraulik Stirrer).
2. with cold water starch, carboxymethyl-cellulose or Bentone LF as extenders (comparison) Place water in container, slowly add extender while stirring, continue stirring for 10 minutes, add PMDI, stir at about 1500 revs/min for 30 seconds.
3. With cold water starch plus extender flour (according to the invention) Place water in container, first add cold water starch, stir 10 minutes, then stir in extender flour until homogeneous, add PMDI, stir at about 1500 revs/min for 30 seconds.
4. Animal glue jelly (comparison) Prepare 4% Optal 1528 solution (in accordance with Manufacturer's instructions), add PMDI and stir with Ultra-Turrax for 30 seconds.

5. Glue solution containing urea formaldehyde resin
Prepare glue solution in accordance with product leaflet of BASF, Ludwigshafen/BRD. Assessment of pot life of the glue dispersion (time during which the glue dispersions is in a workable state)

Optical: homogeneity and viscosity changes were assessed as to their dependence on time.

On some glue dispersions the residual isocyanate content was determined as a function of time.

Surface gluing experiments
Experimental conditions:
Substrate: Chipboard panels (V20, Deutsche Novopan)
Dimensions of panels: 400×400×16 (or 19) mm
Type of veneer: White oak, red oak, elm, sen, ash, sipo mahagony, pear wood, cherry wood
Thickness of veneer: 0.5–0.65 mm
Quantity of glue applied: 75, 90, 100, 150 gm/m$^2$
Applicator tool: toothed spatula
Open time: about 3 minutes
can plates: Aluminum above and below
Press temperature: 120°, 140° C.
Bonding pressure (specific): 1.0, 1.5, 3.0N/mm$^2$
Pressing time: 60, 90, 120, 150, 180 sec.
Test for bonding quality:
Bonding strength The test for bonding strength of the experimental glue bonds was carried out in accordance with DIN 53 255 (delamination test). An additional test for bond strength was carried out by pulling off the overhanging pieces of veneer. The test results were expressed in terms of the following grades (marks).
1. Excellent bonding
2. Good Bonding
3. Adequate bonding
4. Inadequate bonding.
Glue bleeding:
The glue bleeding was assessed on the basis of the following grade marks: (penetration of glue to the surface of the veneer)
1. No penetration
2. Isolated small patches
3. Moderate penetration over areas
4. Severe penetration over the whole surface.

EXAMPLE 1

26 gm of a cold water starch (e.g. Amijel VA 159 ®, Maizena) are added at a constant rate and with stirring at a speed of about 350 revs/min to 100 gm of water in a cylindrical vessel. The mixture is stirred for 10 minutes at about 1000 revs/min until the starch has completely dissolved and the mixture is homogeneous.

51 gm of a wheat flour type 1050 are added to this mixture at a constant rate with continued stirring at a speed of about 500 revs/min. Stirring is continued until a homogeneous mixture has been obtained. 44 gm of a polypheny-polymethylene polyisocyanate mixture (Desmodur VP PU 1520 A 31-Bayer AG, Leverkusen/BRD) are then added to the mixture and the mixture is stirred until a completely homogeneous, slightly creamy dispersion is obtained (11.8% by weight starch, 23% by weight flour, 19.9% by weight polyisocyanate, 45.3% by weight water; viscosity=1980 mPas/25° C. The mixture remains in a satisfactory working condition for 2 to 3 hours (pot life). The glue dispersion can be easily washed off the apparatus with water.

The glue dispersion is applied to a chipboard panel in an amount of 75 gm/m$^2$, using a toothed spatula. A face veneer is applied to the glue covered chipboard and pressed in contact with it for 150 seconds at 140° C. (1.5N/mm$^2$ contact pressure).

A firm bond is established between veneer and the chipboard without any glue bleeding.

EXAMPLE 2

The procedure is as in Example 1 except that 117 gm of water are used instead of 100 g water. 29 gm of a cold water starch are dissolved in the water. 31 gm of rye flour type 1370 are mixed in, followed by 44 gm of polyisocyanate (PMDI from Example 1) and the mixture is stirred. A homogeneous glue dispersion (13.1% starch, 14.0% dry flour, 19.9% polyisocyanate and 53% water) having a viscosity of 2080 mPas/25° C. is obtained.

Using the same quantities and bonding conditions as in Example 1, veneered chipboard panels are produced with good bond strength and no glue bleeding.

EXAMPLE 3

Various glue dispersions according to the invention and comparison glues are prepared from the quantities shown in Table 1.

TABLE 1

Properties of the glue dispersion compositions (PMDI = Desmodur VP PU 1520, A 31, Bayer AG, Leverkusen/BRD)

| Extender | Glue dispersion composition(*) | Homogeneity and viscosity (mPas/25° C.) | Pot life h | % Residual NCO in glue dispersion 0 h | 4 h | 6 h | Working characteristics |
|---|---|---|---|---|---|---|---|
| according to the invention | | | | | | | |
| cold water starch plus cereal flour | 20% PMDI/45% H$_2$O 12% Amijel VA 159 23% wheat 1050 | very good ~2000 | 2–3 | 29 | 25 | 24 | suitable |
| | 20% PMDI/53% H$_2$O 13% Amijel VA 159 14% rye 1370 | good ~2000 | 1–2 | 30 | 28 | 26 | suitable |
| Comparisons | | | | | | | |
| (Flour mixtures alone) | 20% PMDI/53% H$_2$O 27% AHAMA 405 | good ~2000 mPas | <0.5 | 29 | 26 | (**) | unsuitable |
| | 20% PMDI/55% H$_2$O 25% Bonit | good ~2000 mPas | >0.5 | 28 | 23 | (**) | unsuitable |
| (Cereal flour alone) | 20% PMDI/54% H$_2$O 26% wheat 1050 | good ~2000 mPas | 0.5–1 | 27 | 20 | (**) | unsuitable |
| | 20% PMDI/54% H$_2$O | good | 0.5–1 | 28 | 22 | (**) | unsuitable |

TABLE 1-continued

Properties of the glue dispersion compositions (PMDI = Desmodur VP PU 1520, A 31, Bayer AG, Leverkusen/BRD)

| Extender | Glue dispersion composition(*) | Homogeneity and viscosity (mPas/25° C.) | Pot life h | % Residual NCO in glue dispersion 0 h | 4 h | 6 h | Working characteristics |
|---|---|---|---|---|---|---|---|
| Water-soluble starch alone | 26% wheat 1600 20% PMDI/65% H₂O 15% rye 1370 | ~2000 mPas slight separation after about 30 min. | <0.5 | 29 | 29 | (**) | unsuitable |
| | 20% PMDI/74% H₂O 13% Amijel VA 159 | very good ~2000 mPas | <0.5 | 25% NCO | rubber-like mass | | unsuitable |
| | 20% PMDI/74% H₂O 6% Snowflake 12610 | (very) good | <0.5 | 26% NCO | rubber-like mass | | unsuitable |
| Cold water starch + natural starch | 20% PMDI/56% H₂O 16% Amijel VA 159 8% Special starch W | very good | <0.5 | 24% NCO | rubber-like mass | | unsuitable |
| Carboxymethyl-cellulose (as thickener) | 16% PMDI/83% H₂O 1% methylate | foamy, slight inhomogeneity | 1-2 | — | — | — | limited suitability |
| Inorganic thickener | 20% PMDI/78% H₂O 2% Bentone LT | very foamy, inhomogeneous | 1-2 | — | — | — | unsuitable |

(*)Viscosity of all glue dispersion adjusted to about 2000 mPa.s
(**)Solution becomes pasty As may be seen from the Table, the glue dispersion according to the invention have good homogeneity, sufficient pot life and relatively slight fall in NCO content even if stored beyond their pot life. Their working characteristics are satisfactory within the usual time. The comparison samples show on the whole too short a pot life, inadequate working characteristics and poor results after application.

TABLE 2

Influence of the quantity of glue applied on the bonding quality of veneer/chipboard panels. The glue composition: 20% PU 1520 A 31, 45% H₂O, 12% starch (Amijel VA 159, water soluble), 23% wheat flour type 1050.

| Quantity applied gm/m² | Bond strength (grading) | Glue bleeding (grading) |
|---|---|---|
| 75 | 2 | 1 |
| 90 | 2 | 1 |
| 100 | 2-3 | 2 |
| 150 | 2-3 | 3 |

Veneer wood: sen Thickness: 0.5 mm; Temperature at which bonding pressure is applied: 120° C.; Bonding pressure: 1.5 N/mm²; pressing time: 150 sec.

TABLE 3

Influence of the pressing temperature on the bond strength at various pressing time (veneer/chipboard). Glue dispersion: 20% PU 1520 A31, 45% H₂O, 12% starch (Amijel VA 159, water soluble), 23% wheat flour type 1050.

| Pressing temperature | Pressing time sec. | Bond strength | Steam blister formation |
|---|---|---|---|
| L1,5 | | | |
| 120° C. | 120 | 2-3 | none |
| | 150 | 2-(3) | none |
| 140° C. | 90 | 2 | none |
| | 120 | 1-2 | none |

Veneer wood: sen Thickness: 0.5 mm; Bonding pressure: 1.5 N/mm²; Glue application: 100 gm/m².

EXAMPLE 4

TABLE 4

Comparison between the bonding qualities of two glue compositions containing, respectively, wheat flour type 1050 and rye flour type 1370, in each case mixed with starch (according to the invention)

| Glue composition (quantity of glue applied 75 gm/m²) | Pressing time sec. | Bond strength | Glue bleeding |
|---|---|---|---|
| 20% PU 1520 A31 45% H₂O 12% starch (water-soluble) 23% wheat flour 1050 | 120 180 | 2-3 2 | 1 1 |
| 20% PU 1520 A31 53% H₂O 13% starch (water-soluble) 14% rye flour 1370 | 120 150 180 | 2 1-2 1-2 | 1 1 1 |

Veneer wood: white oak; thickness: 0.65 mm; pressing time; 140° C.; bonding pressure: 1.5 N/mm²; Viscosity of glue dispersion adjusted in each case to about 2000 mPa.s/25° C.

EXAMPLE 5

Comparison of bonding qualities of two glue dispersion containing, respectively, wheat flour 1050 and cold water starch as the only extender (comparison experiments).

| Glue dispersion | Pressing time (sec) | Bond strength** | Glue bleeding** |
|---|---|---|---|
| 20% PU 1520 A31 49% H₂O 31% wheat flour type 1050 (inhomogeneous, stable only for a short time) | 60 90 120 180 | 4 3-4 3 3 | 1 2 2 2 |
| 20% PU 1520 A31 61% H₂O 19% starch | 60 90 120 | 4 3-4 3-4 | 1 3 3 |

-continued

| Glue dispersion | Pressing time (sec) | Bond strength** | Glue bleeding** |
| --- | --- | --- | --- |
| Amijel VA 159 | 180 | 3–4 | 3 |

Veneer wood: red oak; thickness: 0.65 mm; pressing temperature; 140° C.; bonding pressure: 1.5 N/mm².
Viscosity of the glue dispersion adjusted to about 2000 mPa.s/25° C.
*Quantity of glue applied 75 gm/m²
**Assessment grading

EXAMPLE 6

(According to the invention) see Example 7 for comparison

TABLE 6

Influence of the proportion of PMDI on the bonding quality

Glue dispersion
Proportions of components in % by wt.

| PMDI Desmodur VP PU 1520 A 31 | H₂O | Cold water starch (Amijel VA 159, Maizena) | Wheat flour 1050 | Bonding quality | |
| --- | --- | --- | --- | --- | --- |
| | | | | Bonding Strength | Glue bleeding |
| 7 | 52 | 11 | 30 | 3–4 | 1 |
| 15 | 48 | 11 | 26 | 2 | 1 |
| 20 | 46 | 11 | 23 | 2 | 1 |
| 50 | 30 | 11 | 9 | 2–3 | 3 |

Type of wood: sen Thickness: 0.6 mm; Pressing temperature: 140° C. Bonding pressure: 1.5 N/mm²; Pressing time: 150 sec.; glue application: 75 gm/m²

EXAMPLE 7 (Comparison)

Influence of the proportion of PMDI on the bonding quality (using starch alone as extender)

TABLE 7

| Glue dispersion | Proportion of PMDI % | Bond strength | Glue bleeding |
| --- | --- | --- | --- |
| 27% cold water starch solution + PMDI (PU 1520 A31) | 7 | 3–4 | 2 |
| | 15 | 3 | 2 |
| | 20 | 3 | 2–3 |
| | 50 | 2–3 | 4 |

Type of wood: elm; thickness: 0.5 mm; pressing temperature: 140° C.; bonding pressure: 1.5 N/mm²; pressing time: 150 sec.; glue application: 100 gm/m².

This comparison Example demonstrates that both bond strength and glue bleeding are unsatisfactory when starch alone is used as extender.

EXAMPLE 8

The procedure is as in Example 1 but 96 gm of water are used instead of 100 gm. 24 gm of a cold water starch (e.g. Amijel VA 146 or Amijel VA 159, Maizena) are dissolved in water. 60 gm of wheat flour type 1600 are mixed in and 60 gm of polyisocyanate, Desmodur 44 VL (Bayer AG, D 5090 Leverkusen) are then added and the components mixed until homogeneous. The glue dispersion is applied to a V20-chipboard panel in an amount of 75 gm/m², using a toothed spatula. A white oak veneer 0.6 mm in thickness is placed on the glue covered chipboard panel and the whole combination is pressed under a pressure of 1.5N/mm² for 150 seconds at about 140° C. A firm bond between the veneer and the chipboard panel is obtained without glue penetration.

EXAMPLE 9

The procedure is the same as in Example 1. 20 gm of a water-soluble starch (Amijel VA 159, Maizena) are dissolved in 100 gm of water. 22 gm of a bean flour mixture (Bonit, Werzel) are mixed in and 36 gm of Desmodur VP PU 1520 A 31 are then added and the mixture is stirred until homogeneous. This glue dispersion may be used as described in Examples 1 and 9 to produce veneered chipboard panels under the same conditions of application of the glue and pressure bonding. Good bonding qualities are obtained.

EXAMPLE 10

22 gm of a water-soluble starch (Amijel VA 159, Maizena) are dissolved in 54 gm of water by the method described in Example 1. 44 gm of wheat flour type 1050 are added to this mixture which is then stirred until homogeneous. In another vessel, 40 gm of Desmodur PU VP 1520 A 31 are added to 40 gm of an aqueous 4% glue solution (emulsifier: Optal T 1528, Sichel, D 2000 Hannover) and the mixture is stirred with an Ultra-Turrax mixer for 30 seconds. An aqueous polyisocyanate emulsion is obtained. This is added to the starch/flour mixture with stirring at a rate of about 500 revs/min. a homogeneous mixture is obtained in about 15 seconds.

This method of preparation of the glue dispersion using an additional emulsifier is more complicated but has no evident advantages compared with the method of preparation described in Example 1. Both the pot life and the working characteristics of the glue compositions are similar. A comparison of the bonding qualities also showed no difference.

EXAMPLE 11

The procedure is the same as in Example 1. 26 gm of Amijel VA 159 cold water starch are dissolved in 98 gm of water. 36 gm of wheat flour type 1050 are added to the starch solution and mixed until homogeneous. 40 gm of Desmodur P PU 1194 (having a viscosity of about 2000 mPas) are then added to the mixture and stirred until homogeneous. A chipboard panel is veneered with a sapo mahogany veneer 0.6 mm in thickness by means of this glue dispersion applied in a quantity of 75 gm/m², the bond between the chipboard and veneer being produced at a pressing temperature of 140° C., a specific bonding pressure of 1.5N/mm² and a pressing time of 150 sec. A firm bond without glue bleeding is obtained. The glue dispersion is characterized by a somewhat longer pot life (compared with the composition of Example 1) (about 3.5 hours).

EXAMPLE 12

The pressing times can be shortened by the addition of known polyurethane activators (e.g. tertiary amines). The procedure is as in Example 1. 26 gm of Amijel VA 159 cold water starch are dissolved in 100 gm of water. 40 gm of wheat flour type 1050 are added to the starch solution and the components are mixed until homogeneous. 0.4 gm of Desmorapid VP PU 1343 A tert. amine catalyst of Bayer AG, D 5090 Leverkusen (1%, based on PMDI) is stirred into this mixture. 40 gm of Desmodur VP PU 1520 A31 are then added and mixed until homogeneous. This glue dispersion is applied in a quantity of 75 gm/m$^2$ to a chipboard panel to veneer it with a sapo mahogany veneer 0.6 mm in thickness under a pressure temperature of 140° C., a specific bonding pressure of 1.5N/mm$^2$ and a pressing time of 100 sec. The bonding quality obtained after this pressing time is equal to that obtained after 150 seconds, e.g. in Example 1. The pot life of the glue composition, on the other hand, is shorter, being about 1 ½ hours.

EXAMPLE 13

The glue dispersion according to the invention may also be used in combination with condensation resins, e.g. urea formaldehyde resins.

The procedure is the same as in Example 1, 26 gm of cold water starch (e.g. Amijel VA 159, Maizena) are dissolved in 100 gm of water. 40 gm of wheat flour type 1600 are added to the starch solution and mixed in. 80 gm of a urea formaldehyde resin (66.5% solids content, Kaurit glue 385 liquid, BASF) are added to this mixture together with 8 gm of hardener-40 powder (BASF) and the mixture is stirred until homogeneous. 40 gm (PMDI) Desmodur PU 1520 A31 are then added and emulsified therein until homogeneous. Face veneers (e.g. sapo mahogany, white oak or ash veneers 0.6 mm in thickness) are applied to chipboard panels under the same conditions of glue application and pressing as in Example 11. The bonding quality of these finished products is comparable to that of the veneers obtained without condensation resin. Mixed bonding with condensation resins has however, the disadvantage that the bond is no longer free from formaldehyde.

EXAMPLE 14

TABLE 10

Influence of type of PMDI on the pot life
Glue dispersions** containing starch*/flour combination according to the invention

| PMDI type | Glue dispersion | Pot life h | Residual NCO % 0 h | 4 h |
|---|---|---|---|---|
| Desmodur VP PU 1520 A 3 | 20% PMDI/45% H$_2$O 12% starch/23% wheat 1050 | 2-3 | 28 | 25 |
| Desmodur VP PU 1194 | 20% PMDI/49% H$_2$O 13% starch/18 g wheat 1050 | 3 | 29 | 28 |
| Desmodur 44 V 20 | 20% PMDI/45% H$_2$O 12% starch/23% wheat 1050 | 1-2 | 28 | 27 |
| Desmodur 44 VL | 20% PMDI/45% H$_2$O 12% starch/23% wheat 1050 | 1-2 | 29 | 27 |

*cold water starch, Amijel VA 159 (Maizena)
**about 2000 mPa.s/25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous glue dispersion having a solid content of from 22-65% by weight, comprising
   7-50% by weight of at least one polyisocyanate having an average functionality greater than 2.0,
   5-20% by weight of at least one soluble starch and
   10-35% by weight of at least one flour,
   and optionally conventional additives and having a viscosity in the range of 500 to 10000 mPas/25° C.

2. A glue dispersion as claimed in claim 1, comprising
   15-30% by weight of at least one aromatic polyisocyanate having an average functionality greater than 2.0,
   10-15% by weight of at least one soluble starch, and
   14-25% by weight of at least one flour,
   and optionally conventional additives and having a solid content of 29-65% by weight and a viscosity in the range of 1000 to 4000 mPas/25° C.

3. A glue dispersion as claimed in claim 1, wherein said polyisocyanate is a polyphenyl-polymethylene polyisocyanate having a viscosity of 50-5000 mPas/25° C., an isocyanate content of 26 to 33% by weight and a functionality of >2,0.

4. A glue dispersion as claimed in claim 1, wherein as starch a cold water soluble starch or a hydrolyzed natural starch and as flour wheat, rye or bean flour or a combination thereof is used.

5. A glue dispersion as claimed in claim 1 admixed with at least one conventional adhesive system based on an aqueous solution of a member selected from the group consisting of phenol, urea, melamine/formaldehyde adhesive, tannin, bark extract, sulphite waste liquor, lignin sulphonate, natural adhesives based on albumin and synthetic adhesive in a proportion in the range of 1:20 to 20:1.

6. A process for preparing the glue dispersion as claimed in claim 1, wherein an aqueous starch solution is mixed with said flour and the polyisocyanate is emulsified in this mixture at a temperature of up to 45° C.

7. The process as claimed in claim 6, wherein said polyisocyanate is first emulsified in an aqueous solution of said starch and at a temperature of up to 45° C. and said flour is then added.

8. A process for gluing laminating materials to wood and wood panels comprising applying the glue dispersion of claim 1 to at least one surface to be glued at an amount of 30 to 300 gm/m$^2$ and with the application of specific bonding pressure of 0.2 to 10N/mm$^2$ at a pressing temperature of 70° to 200° C. at a pressing time of 30-600 seconds.

9. The process of claim 8, wherein the application is by means of a conventional glue spreading machine.

* * * * *